(12) United States Patent
Sevart et al.

(10) Patent No.: US 8,074,690 B2
(45) Date of Patent: Dec. 13, 2011

(54) DECOUPLING GROOVE FOR PNEUMATIC TIRE TREAD

(75) Inventors: Jeffrey Leon Sevart, Akron, OH (US); Paul Keyser Blackiston, Ridgeley, WV (US); Pedro Yap, Silver Lake, OH (US); Larry Ashley Gordon, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 580 days.

(21) Appl. No.: 12/268,477

(22) Filed: Nov. 11, 2008

(65) Prior Publication Data
US 2010/0116390 A1    May 13, 2010

(51) Int. Cl.
*B60C 11/01* (2006.01)
*B60C 11/04* (2006.01)

(52) U.S. Cl. ............... 152/209.14; 152/209.16; 152/901

(58) Field of Classification Search ............... 152/209.1, 152/209.13, 209.14, 209.16, 209.26, 901
See application file for complete search history.

(56) References Cited

U.S. PATENT DOCUMENTS

| | | | |
|---|---|---|---|
| 3,983,920 A | 10/1976 | Gardner et al. | 152/362 |
| 4,055,209 A | 10/1977 | Senger | 152/209 |
| 4,262,721 A * | 4/1981 | Tadokoro et al. | 152/209.14 |
| 5,115,849 A * | 5/1992 | Corner | 152/209.14 |
| 5,660,652 A * | 8/1997 | Young et al. | 152/209.14 |
| 6,109,316 A | 8/2000 | Janajreh | 152/209 |
| 6,247,514 B1 | 6/2001 | Kim et al. | 152/556 |
| 6,408,909 B1 | 6/2002 | Nguyen | 152/209 |
| 6,550,509 B1 * | 4/2003 | Nguyen et al. | 152/209.14 |
| 6,857,458 B2 | 2/2005 | Sinopoli et al. | 152/556 |
| D559,770 S | 1/2008 | Blackiston et al. | D12/555 |
| 2004/0016497 A1 | 1/2004 | Morgan et al. | 152/556 |
| 2006/0157182 A1 | 7/2006 | Lahure et al. | 152/541 |

* cited by examiner

*Primary Examiner* — Eric Hug
(74) *Attorney, Agent, or Firm* — Robert N. Lipcsik

(57) ABSTRACT

A pneumatic radial ply truck tire for use on medium truck trailers includes a tread, a casing with two sidewalls, one or more radial plies extending from, and wrapped about, two annular beads, and a belt reinforcement structure located radially between the tread and the one or more radial plies. The tread includes a plurality of circumferentially extending tread grooves, a pair of circumferentially extending shoulder ribs, a pair of radially recessed ribs being radially recessed and non-road contacting under static load disposed at a lateral edge of the shoulder ribs, and a pair of circumferentially extending decoupling grooves. Each decoupling groove defines a transition between a corresponding shoulder rib and a corresponding recessed rib. A lateral edge of one of the shoulder ribs has a first radius of curvature forming a transition from a radially outer surface of the shoulder rib to a first side surface of the corresponding decoupling groove. A base surface of the decoupling groove has a second radius of curvature forming a transition from the first side surface to a second side surface of the decoupling groove. A radially outer surface of the corresponding recessed rib has a third radius of curvature forming a continuous transition from the second side surface to a third outer side surface of the shoulder portion of the tread.

4 Claims, 4 Drawing Sheets

DECOUPLING GROOVE FOR PNEUMATIC TIRE TREAD

FIELD OF INVENTION

The present invention relates to truck tires and treads for truck tires and, particularly, to side tread decoupling grooves for inhibiting crack propagation from a sidewall to the tread.

BACKGROUND OF THE INVENTION

The use of treads specifically designed for truck tires has been directed to various forms of rib-type tires. This non-driving axle exhibits cornering and turning loads as well as straight line running loads. Some skilled in the art believe the tread ribs should ideally have a sharp edge adjacent circumferential grooves to provide improved handling.

These conventional sharp edges, during normal use, may exhibit irregular tread wear. Thus, high wear erosion may be common in the shoulder region of such a tread. One conventional approach may use a laterally located circumferentially continuous rib that, under normal driving conditions, may be in contact with the road. The force or pressure exerted by the lateral rib on the road is less than the force or pressure of a shoulder rib on the road. The conventional tire thereby may rely on the lateral rib to protect the sharp edge of the shoulder rib.

Another conventional approach includes a non-radially-recessed circumferential rib adjacent a narrow circumferentially continuous groove and a shoulder rib. Still another conventional approach provides a tire tread with a plurality of circumferentially continuous grooves, a pair of radially recessed shoulder ribs, and a pair of narrow circumferential decoupling shoulder grooves. The radially recessed ribs of the tire, as molded, may be non-road contacting, under static load and normal driving conditions. The tire may exhibit improved wear, maintaining the sharp edge of the shoulder rib without creating other non-uniform wear problems. Although the above-mentioned conventional tires may provide wear in excess of 100,000 miles on the original tread, a new and superior solution to irregular tread wear problems would be desirable.

SUMMARY OF THE INVENTION

A pneumatic radial ply truck tire for use on medium truck trailers, in accordance with the present invention, includes a tread, a casing with two sidewalls, one or more radial plies extending from, and wrapped about, two annular beads, and a belt reinforcement structure located radially between the tread and the one or more radial plies. The tread includes a plurality of circumferentially extending tread grooves, a pair of circumferentially extending shoulder ribs, a pair of radially recessed ribs being radially recessed and non-road contacting under static load disposed at a lateral edge of the shoulder ribs, and a pair of circumferentially extending decoupling grooves. Each decoupling groove defines a transition between a corresponding shoulder rib and a corresponding recessed rib. A lateral edge of one of the shoulder ribs has a first radius of curvature forming a transition from a radially outer surface of the shoulder rib to a first side surface of the corresponding decoupling groove. A base surface of the decoupling groove has a second radius of curvature forming a transition from the first side surface to a second side surface of the decoupling groove. A radially outer surface of the corresponding recessed rib has a third radius of curvature forming a continuous transition from the second side surface to a third outer side surface of the shoulder portion of the tread.

According to another aspect of the present invention, the radially outer surface of the recessed rib and the third radius of curvature define a nub for repelling materials that damage the tread.

According to still another aspect of the present invention, the first radius of curvature is between 4 mm and 8 mm.

According to yet another aspect of the present invention, the second radius of curvature is between 2 mm and 4 mm.

According to still another aspect of the present invention, the third radius of curvature is between 1 mm and 3 mm.

According to yet another aspect of the present invention, a lateral projection further provides protection from shoulder damage.

According to still another aspect of the present invention, the lateral projection is disposed radially inward from the radially outer surface of one of the recessed ribs.

DEFINITIONS

"Apex" means an elastomeric filler located radially above the bead core and between the plies and the turnup ply.

"Bead" means that part of the tire comprising an annular tensile member wrapped by ply cords and shaped, with or without other reinforcement elements such as flippers, chippers, apexes, toe guards and chafers, to fit the design rim.

"Belt Structure" means at least two annular layers or plies of parallel cords, woven or unwoven, underlying the tread, unanchored to the bead, and having both left and right cord angles in the range from 15.degree. to 68.degree. with respect to the circumferential centerline of the tire.

"Casing" means the carcass, belt structure, beads, sidewalls, and all other components of the tire excepting the tread and undertread. The casing may be new, unvulcanized rubber or previously vulcanized rubber to be fitted with a new tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the belts and plies in the tire are comprised.

"Lateral" means an axial direction.

"Ply" means a continuous layer of elastomeric rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65 degrees and 90 degrees with respect to the equatorial plane of the tire.

"Shoulder" means the upper portion of sidewall just below the tread edge; tread shoulder or shoulder rib means that portion of the tread near the shoulder.

"Sidewall" means that portion of a tire between the tread and the bead.

"Tread" means a rubber or elastomeric component including that portion of the tire that comes into contact with the road under normal inflation and load.

DETAILED DESCRIPTION OF AN EXAMPLE EMBODIMENT

Figure 1:
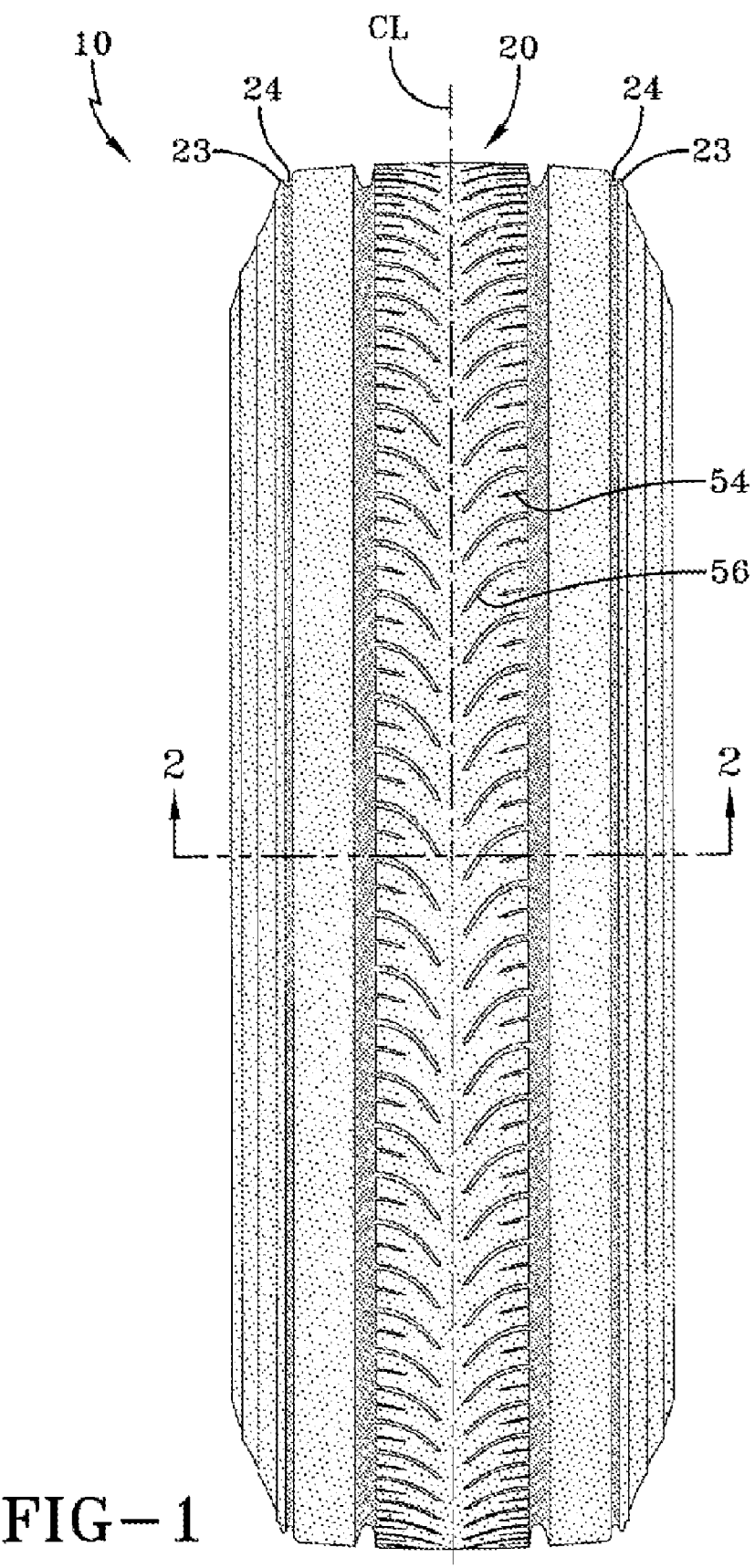
FIG. 1 is a schematic front elevation view of a tire tread in accordance with the present invention.
Figure 2:
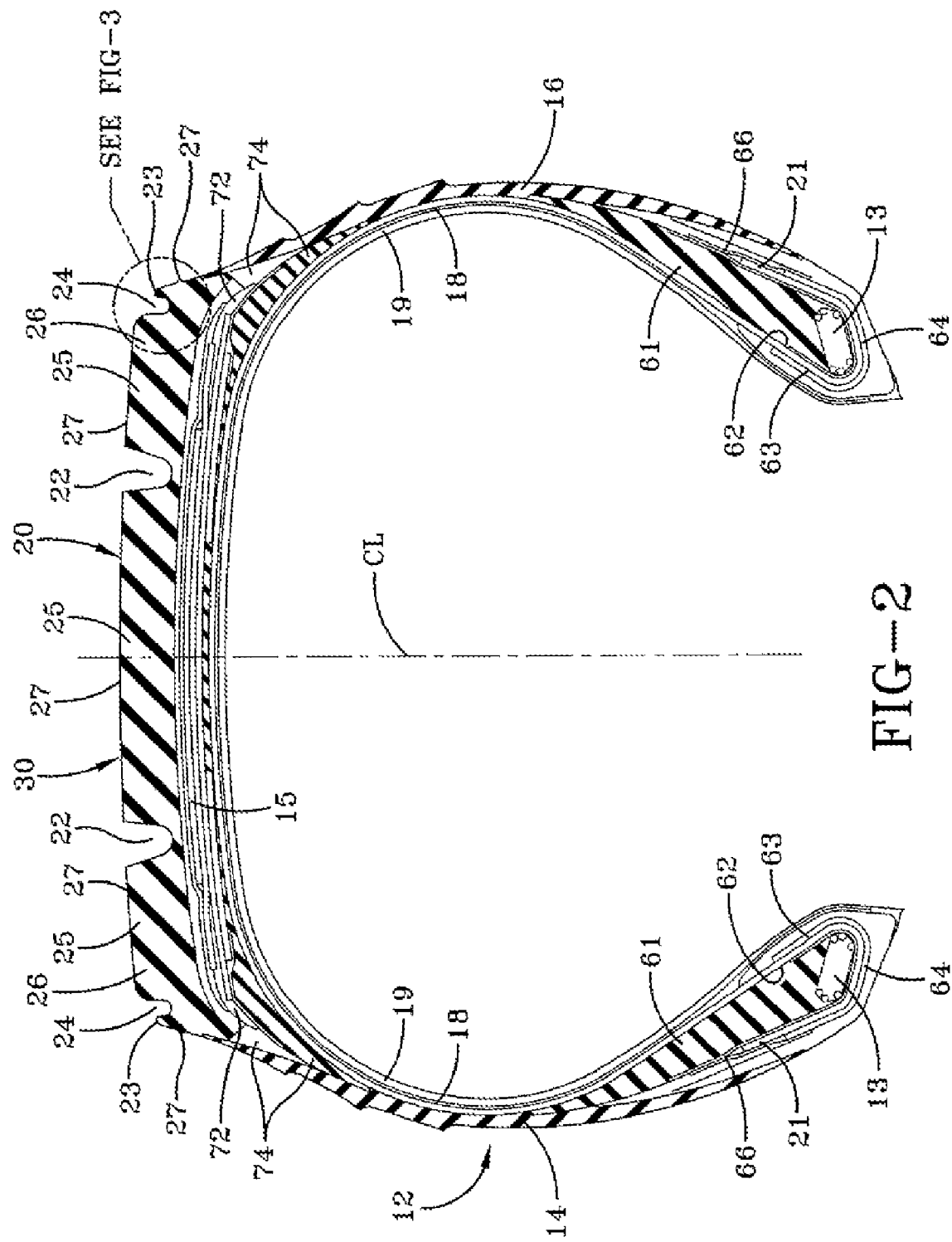
FIG. 2 is a schematic cross-section view of a tire for use with the present invention.

FIGS. 1 and 2 show an example tire 10 for use with the present invention. The tire 10 has a tread 20 and a casing 12. The casing 12 has two sidewalls 14, 16, one or more radial plies 18 extending from, and wrapped about, two annular beads 13, and a belt reinforcement structure 15 located radially between the tread 20 and the ply or plies 18.

The plies 18 and the belt reinforcement structure 15 may be cord reinforced elastomeric material. The cords may be, for example, steel wire filaments and the elastomer may be, for example, a vulcanized rubber material. Similarly, the annular beads 13 may have steel wires wrapped into a bundle forming a bead core. A liner component 19, for example a halobutyl rubber, may form a somewhat air impervious chamber to contain the air pressure when the tire 10 is inflated.

The tire 10 may further include an elastomeric apex 61 radially disposed above each bead 13. A turnup 21 of the ply 18 in each bead area may be reinforced with a flipper 62, a chipper 63, a gum and fabric chafer 64, a gum strip 66, and/or elastomeric wedges 63. Additionally, the belt reinforcement structure 15 may include a gum strip of rubber material 72 and a plurality of elastomeric strips or wedges 75 in the lateral extremes or edges of the belt reinforcement structure 15 in proximity of decoupling grooves 24 at the lateral shoulders of the tread 20. Although not required to the practice of the inventive concept, these features are disclosed as features employed by the example embodiment.

In accordance with the present invention, the tread 20 may have a plurality of circumferentially continuous grooves 22, a pair of radially recessed, nub-style, ribs 23 located at the lateral extremes or shoulders of the tread, the pair of narrow circumferential decoupling grooves 24, and a plurality of tread ribs 25, including a pair of shoulder ribs 26, one shoulder rib being adjacent each narrow circumferential decoupling groove 24. A plurality of lateral sipes 54 or lateral grooves 56 may be employed on the example tread 20, as shown in FIG. 1.

The radially recessed ribs 23 are non-road contacting under static load, as well as under normal driving conditions. The distance halfway between the narrow decoupling grooves 24 may define a centerline CL of the tread 20. The radially outer, road-contacting surfaces 27 of the plurality of tread ribs 25 may define a radially outer tread surface 30. The outer tread surface 30 may be adjacent to, and extend between, the pair of narrow circumferential decoupling grooves 24.

If too much rubber is added to a shoulder rib 25, adjacent a decoupling groove 24, the area adjacent the shoulder rib 25 may become lightly loaded. When this condition occurs, erosion wear, or "river wear", may occur at the groove 22 adjacent the shoulder rib 25. To prevent this from occurring, a lateral tread balance may be maintained. Preferably, both edges of the shoulder ribs 25 wear at an equal and uniform rate. This condition can achieve a greater mileage life of the example tread 20.

Figure 3:
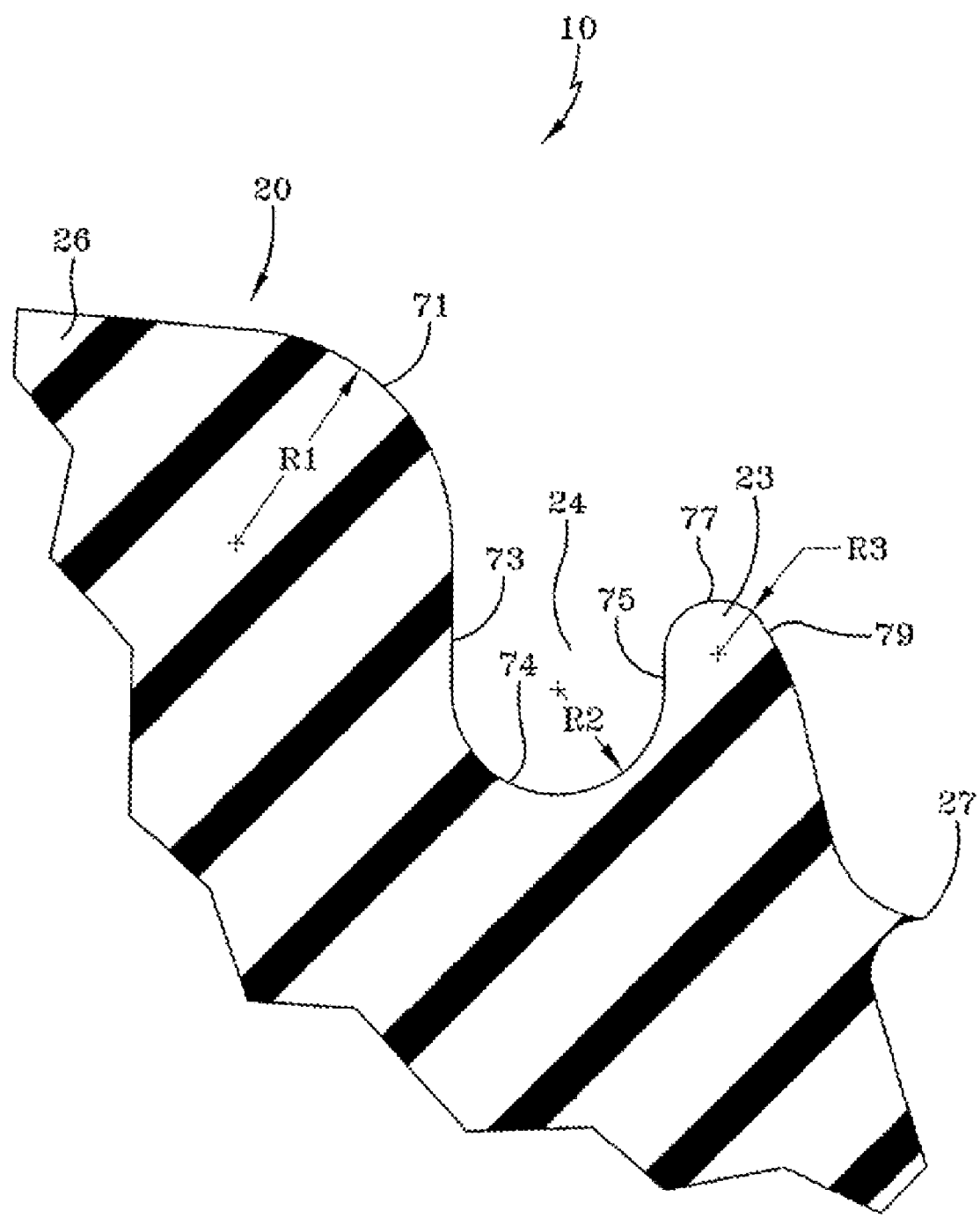
FIG. 3 is schematic detailed cross-section view of a portion of the tire tread of the tire of FIG. 2.

The detail of FIG. 3 shows one shoulder rib 26 and one radially recessed rib 23 separated by the decoupling groove 24. The lateral edge 71 of the shoulder rib 26 has a first radius of curvature RI forming a transition from the radially outer surface 27 of the shoulder rib to a first, generally planar, side surface 73 of the decoupling groove 24. The first radius of curvature R1 may be, for example, between 4 mm and 8 mm. The curved base surface 74 of the decoupling groove 24 has a second radius of curvature R2 forming a transition from the first side surface 73 to a second, generally planar, side surface 75 of the decoupling groove 24. The second radius of curvature R2 may be, for example, between 2 mm and 4 mm. The radially outer surface 77 of the recessed rib 23 has a third radius of curvature R3 forming a continuous transition from the second side surface 75 to a third, generally planar, outer side surface 79 of the shoulder portion of the tread 20. The continuously rounded, nub-like, radially outer surface 77 of the recessed rib 23 thereby provides no sharp edges for incurring an impact and subsequent damage. The third radius of curvature R3 may be, for example, between 1 mm and 3 mm.

The mold shape and tread in accordance with the present invention may provide improved resistance to tread damage. The rounded surfaces protect against tears or punctures by facilitating repelling of road materials, such as rocks and any other sharp-edged objects. The mold shape and tread may also allow for lower rolling resistance tread compounds (with inherently lower tear strength) to be used on medium truck trailer tires, thereby improving fuel economy.

Specifically, the decoupling grooves and shoulder ribs in accordance with the present invention may reduce tear and other damage potential to the shoulder portion of the tread area, allow for the use of tread compounds with lower rolling resistance and tear strength while still achieving acceptable tire damage resistance, provide rounded surfaces 71, 74, 77, or radii R1, R2, R3, on the outer shoulder edge portion to reduce potential shoulder damage (i.e., from rocks, etc.), and reduce grooves and blades on shoulder and interior tread elements to minimize potential damage initiation sites.

Figure 4:
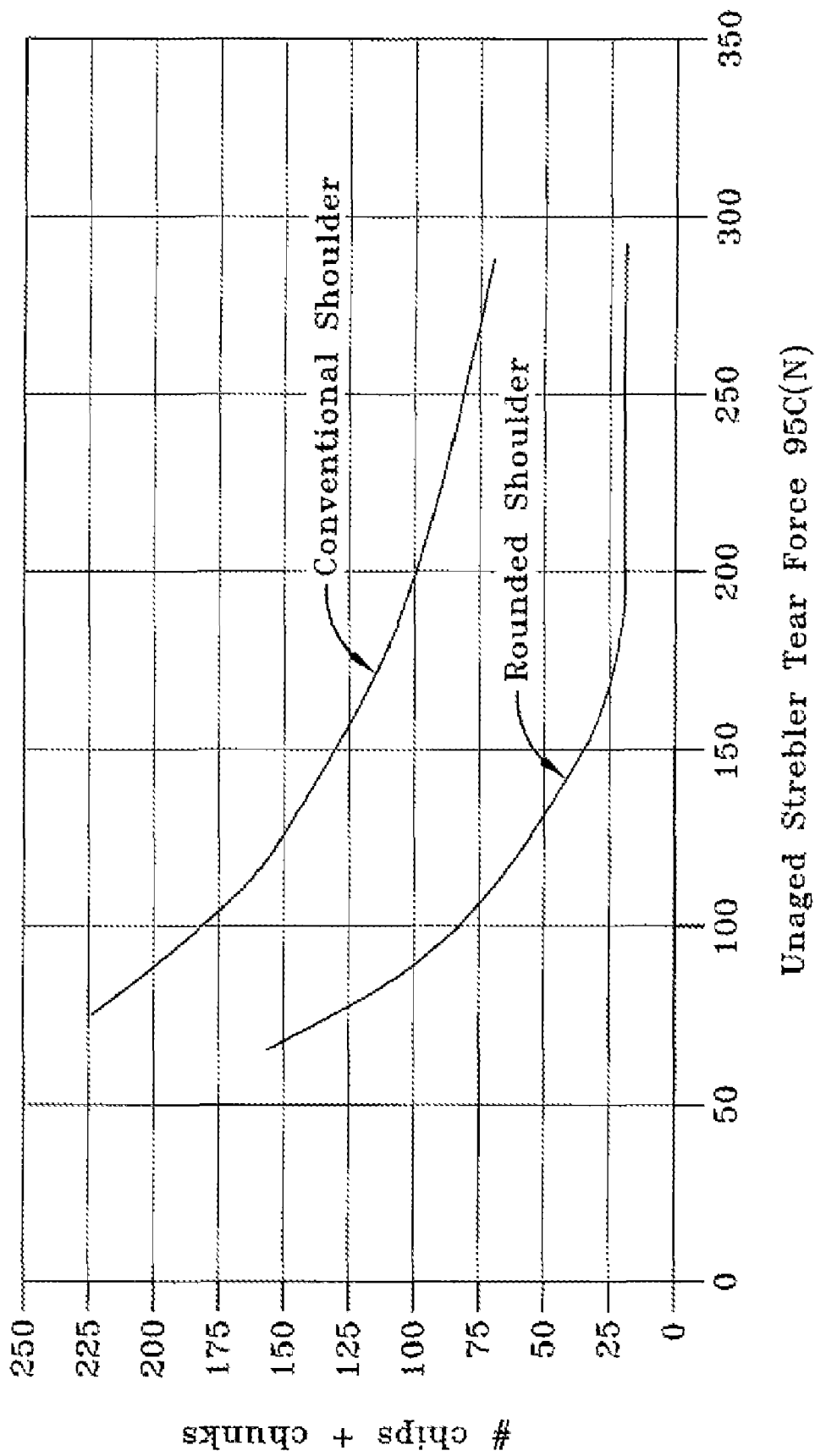
FIG. 4 is graph showing the improved performance of a tire in accordance with the present invention.

Test data indicates that the rounded shoulder surface 71 and the continuously rounded recessed nub 23 provide greater resistance to damage than conventional shoulder designs, as seen in the graph of FIG. 4. In fact, as the incurred tearing force increases, the improved shoulder configuration of the present invention incurs less than half the number of chips and chunks.

Additionally, the recessed ribs 23 may further have lateral projections 27 for further providing protection from shoulder damage. The projections 27 may be disposed adjacent the recessed ribs 23 and radially inward from the third radius of curvature R3.

While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A pneumatic radial ply truck tire for use on medium truck trailers, the tire including a tread, a casing, the casing having two sidewalls, one or more radial plies extending from, and wrapped about, two annular beads, and a belt reinforcement structure located radially between the tread and the one or more radial plies, the tread comprising:
   a plurality of circumferentially extending tread grooves;
   a pair of circumferentially extending shoulder ribs;
   a pair of radially recessed ribs, the radially recessed ribs being radially recessed and non-road contacting under static load, the recessed ribs being disposed at a lateral edge of the shoulder ribs; and a pair of circumferentially extending decoupling grooves, each decoupling groove defining a transition between a shoulder rib and a recessed rib, a lateral edge of one of the shoulder ribs having a first radius of curvature forming a transition from a radially outer surface of the shoulder rib to a first side surface of the corresponding decoupling groove, a base surface of the decoupling groove having a second radius of curvature forming a transition from the first side surface to a second side surface of the decoupling groove, a radially outer surface of the corresponding recessed rib having a third radius of curvature forming a continuous transition from the second side surface to a third outer side surface of the shoulder portion of the tread, the radially outer surface of the recessed rib and the third radius of curvature defining a nub for repelling materials that damage the tread, the first radius of curvature being between 4 mm and 8 mm and the second radius of curvature being between 2 mm and 4 mm.

2. The pneumatic tire as set forth in claim 1 wherein the third radius of curvature is between 1 mm and 3 mm.

3. The pneumatic tire as set forth in claim 1 further including a lateral projection for further providing protection from shoulder damage.

4. The pneumatic tire as set forth in claim 3 wherein the lateral projection is disposed radially inward from the radially outer surface of one of the recessed ribs.

\* \* \* \* \*